US009098697B2

(12) United States Patent
Yablokov et al.

(10) Patent No.: US 9,098,697 B2
(45) Date of Patent: Aug. 4, 2015

(54) SYSTEM AND METHOD FOR DETECTING MALWARE USING ISOLATED ENVIRONMENT (71) Applicant: Kaspersky Lab ZAO, Moscow (RU)

(72) Inventors: Victor V. Yablokov, Moscow (RU); Evgeny Y. Eliseev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 69 days.

(21) Appl. No.: 14/039,476

(22) Filed: Sep. 27, 2013

(65) Prior Publication Data

US 2014/0181974 A1 Jun. 26, 2014

(30) Foreign Application Priority Data

Dec. 25, 2012 (RU) ................................ 2012156433

(51) Int. Cl.
G06F 21/53 (2013.01)
G06F 21/56 (2013.01)
(52) U.S. Cl.
CPC .............. G06F 21/53 (2013.01); G06F 21/566 (2013.01); G06F 2221/2149 (2013.01)
(58) Field of Classification Search
CPC .......................... G06F 21/53; G06F 2221/2149
USPC ................................................ 726/29, 26, 27
See application file for complete search history.

(56) References Cited

U.S. PATENT DOCUMENTS

| 6,658,571 B1 | 12/2003 | O'Brien et al. |
| 6,775,780 B1 | 8/2004 | Muttik |
| 6,799,316 B1 | 9/2004 | Aguilar et al. |
| 6,823,460 B1 | 11/2004 | Hollander et al. |
| 7,035,279 B2* | 4/2006 | Bruckman ..................... 370/460 |
| 7,191,441 B2 | 3/2007 | Abobott et al. |
| 7,590,980 B1* | 9/2009 | Clubb et al. .................. 717/163 |

(Continued)

FOREIGN PATENT DOCUMENTS

| CN | 102750475 A | 10/2012 |
| RU | 2313126 C2 | 12/2007 |

OTHER PUBLICATIONS

Schmid et al.; Protecting data from malicious software; Published in: Computer Security Applications Conference, 2002 Proceedings; 18th Annual; Date of Conference: 2002; pp. 199-208; IEEE Xplore.*

(Continued)

Primary Examiner — Bradley Holder
(74) Attorney, Agent, or Firm — Arent Fox LLP; Michael Fainberg (57) ABSTRACT Disclosed system and methods for detecting malicious applications. The system provides a library of handler functions. The handlers functions control access of one or more applications to protected resources on a user device. The system also modifies the one or more applications to access the library of handler functions instead of corresponding application program interface (API) functions of the user device. The handler functions receive API function calls from a modified application. The system analyzes the received API function calls for malicious behavior characteristics. When the API function calls do not exhibit malicious behavior characteristics, the handler functions perform the API function calls to the protected resources. When the API function calls exhibit malicious behavior characteristics, the system prevents access of the modified application to the protected resources.

17 Claims, 7 Drawing Sheets

(56) References Cited

U.S. PATENT DOCUMENTS

| | | | |
|---|---|---|---|
| 7,783,884 B2 * | 8/2010 | Nakano et al. | 713/175 |
| 8,099,596 B1 | 1/2012 | Rusakov et al. | |
| 8,239,939 B2 | 8/2012 | Dunagan et al. | |
| 8,332,464 B2 * | 12/2012 | Dispensa et al. | 709/203 |
| 8,588,424 B2 * | 11/2013 | Yamada et al. | 380/281 |
| 2002/0019887 A1 * | 2/2002 | Moore | 709/328 |
| 2002/0065776 A1 | 5/2002 | Calder et al. | |
| 2002/0085021 A1 * | 7/2002 | Sullivan et al. | 345/716 |
| 2002/0118700 A1 * | 8/2002 | Bruckman | 370/460 |
| 2002/0180783 A1 * | 12/2002 | Broussard | 345/744 |
| 2002/0180790 A1 * | 12/2002 | Broussard | 345/762 |
| 2003/0033443 A1 * | 2/2003 | Igotti | 709/328 |
| 2003/0177284 A1 * | 9/2003 | De Bonet | 709/328 |
| 2003/0187869 A1 * | 10/2003 | de Bonet | 707/102 |
| 2004/0039924 A1 | 2/2004 | Baldwin et al. | |
| 2004/0237071 A1 * | 11/2004 | Hollander et al. | 717/124 |
| 2007/0283151 A1 * | 12/2007 | Nakano et al. | 713/168 |
| 2008/0313648 A1 * | 12/2008 | Wang et al. | 719/315 |
| 2009/0113444 A1 * | 4/2009 | Hackborn et al. | 719/312 |
| 2010/0175104 A1 * | 7/2010 | Khalid | 726/1 |
| 2012/0036561 A1 | 2/2012 | Budko et al. | |
| 2012/0096555 A1 | 4/2012 | Mahaffey | |

OTHER PUBLICATIONS

Bierman et al.; Classification of malicious host threats in mobile agent computing; Published in: Proceeding SAICSIT '02 Proceedings of the 2002 annual research conference of the South African institute of computer scientists and information technologists on Enablement through technology; 2002; pp. 141-148.*

Thomas Blai Sing et al: "An Android Application Sandbox System for Suspicious Software Detection", Malicious and Unwanted Software (Malware), 2010 5th International Conference on, IEEE, Piscataway, NJ, USA,Oct. 19, 2010, pp. 55-62, XP031833825, ISBN: 978-1-4244-9353-1.

Fraser T et al: "Hardening Cots Software With Generic Software Wrappers", Proceedings of the 1999 IEEE Symposium on Security and Privacy. Oakland, CA, May 9-12, 1999; [Proceedings of the IEEE Symposium on Security and Privacy], Los Alamitos, CA : IEEE Comp. Soc, US, May 9, 1999, pp. 2-16, XP000871969, ISBN: 978-0-7695-0177-2.

European Search Report for EP Application 13192835.0-1870 Dated Mar. 19, 2014, 9 Pages.

* cited by examiner

SYSTEM AND METHOD FOR DETECTING MALWARE USING ISOLATED ENVIRONMENT

CROSS-REFERENCE TO RELATED APPLICATIONS

This application claims benefit of priority under 35 U.S.C. 119(a)-(d) to a Russian Application No. 2012156433 filed on Dec. 25, 2012, which is incorporated by reference herein.

TECHNICAL FIELD

The disclosure relates generally to the field of information security, and more specifically to systems and methods for detecting malware using isolated environment.

BACKGROUND

The number of mobile communication devices is constantly growing, and they have penetrated into all areas of human life. The most popular of these are telephones, smartphones, notebooks, tablets and navigation systems. Mobile devices are primarily used for communication and entertainment. In parallel with the development of these devices, new wireless communication systems, networks and protocols are also being developed. The transmission of data from one device to another and the exchange of information are tasks that even an inexperienced users can perform without difficulty. But the development of new technologies brings not only benefits, but also creates problems.

On one hand, the development of mobile devices and wireless communication systems simplifies human interaction facilitates exchange of information, and erases geographical boundaries. On the other hand, new technologies create new security problems. The ease of copying and exchanging of information causes leaks, whether deliberate or accidental, of confidential personal or business information from organization networks. Therefore, information security specialists responsible for administration of information security infrastructure need to extra vigilant in protecting corporate IT systems in order prevent information leaks and various security breaches.

In addition, the growth in popularity of mobile platforms, such as Android and iOS, is attracting the attention of hackers who have various goals—from a desire to play jokes or show off, to the theft of confidential information for the purpose of extortion and blackmail. As a result of this, computer threats, such as viruses, worms and other types of malware, which were previously characteristic of desktop computers are beginning to appear on mobile platforms as well. New threats unique to mobile devices are also appearing, such as Trojan horses, which after being installed on a mobile device, send SMS messages to telephone numbers or use geolocation services to track the movements of the device user.

Therefore, there is a need for a security system to protect mobile devices from malware, information leaks, unauthorized access and other security threats.

SUMMARY

Disclosed system, method and computer program product for protecting computer resources from leaks and unauthorized access. In one aspect of the invention, a protection system includes an isolated environment, such as a container, into which one or more applications that seek access to protected system resources on a user device may be placed. The system also provides a library of handler functions. The handlers functions control access of one or more applications to the protected resources. The system also modifies the one or more applications to access the library of handler functions instead of corresponding application program interface (API) functions of the user device. The handler functions receive API function calls from a modified application. The system analyzes the received API function calls for malicious behavior characteristics. When the API function calls do not exhibit malicious behavior characteristics, the handler functions perform the API function calls to the protected resources. When the API function calls exhibit malicious behavior characteristics, the system prevents access of the modified application to the protected resources.

In one example aspect, one or more actions preventing access of the application to the protected resources include blocking API function calls from the application, terminating execution of the application or sending a warning notification to a user.

In one example aspect, modifying an application includes replacing one or more classes or methods of the application that perform API function calls to the protected resources with one or more function calls to corresponding handler functions contained in the library. In another aspect, replacing one or more classes or methods of the application includes replacing one or more classes or methods contained in an application file having *.dex extension.

In one example aspect, placing a plurality of applications into the container and associating the same security policy with all applications in the container.

In one example aspect, the protected system resources include one or more of network resources, file system, operating system, and other applications or programs.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of system, method and computer program product for protecting computer resources from leaks and unauthorized access. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to provide security for a user device, such as mobile device, it is desirable to oversee all of the data being transmitted from the device, keep track of data arriving at the device, and keep track of events on devices and the data with which these devices are working. A mobile device is generally under the control of a mobile operating system (OS). The most popular mobile OS being Google Android, Apple iOS, Symbian, BlackBerry OS and Windows Phone. The applications which can be installed on the devices have access to the resources of the mobile device and to the communication ports via interfaces that are provided by the OS. The resources of a mobile device include those means of data processing system, of the device that can be assigned to data processing for a particular unit of time. The primary resources of the data processing system are the processors, RAM, sets of data and networking and peripheral devices. The interface provided by the OS to interact with the resources of the device may be realized as application programming interface (API) functions. In this way, the application can perform operations with files, interact with memory, network, peripherals, etc. One of the ways of monitoring and controlling access of applications to the critical (i.e., protected) resources of a mobile device is to modify the code of the application that calls critical API functions. Hereinafter, the term critical refers to functions and resources that should be protected from unauthorized access certain system files and network ports).

Figure 1A:
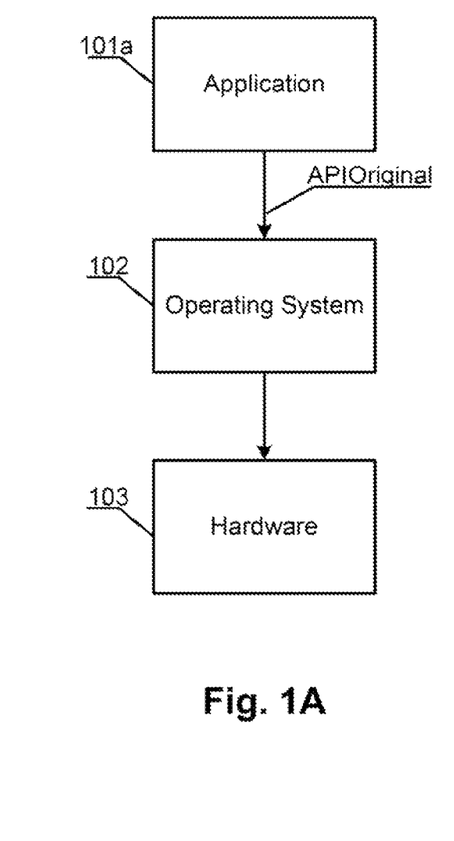
FIG. 1A is a flow diagram illustrating a typical interaction of an application with the operating system and the hardware of a mobile device.
Figure 1B:
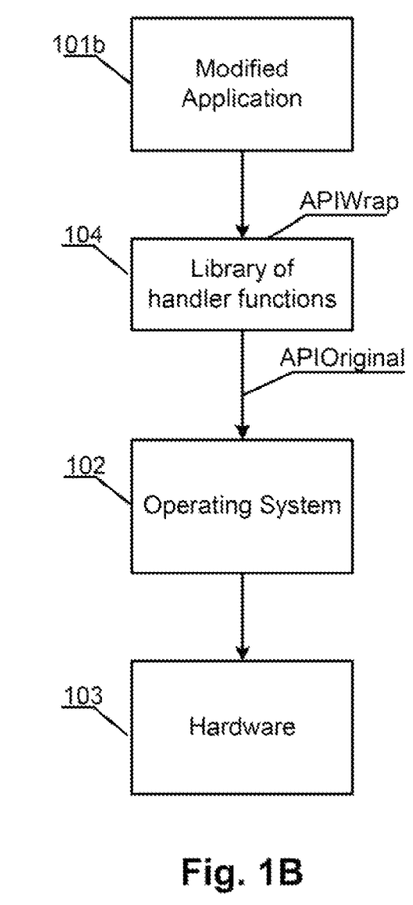
FIG. 1B is a flow diagram illustrating an interaction of an application with an operating system and hardware of a mobile device in accordance with aspects of the present invention.

FIG. 1A shows interaction of an application with an OS and hardware of a user device, such as a mobile phone, tablet computer, laptop, desktop or the like. The user application 101a accesses, via API functions, the OS 102, which in turn provides the direct access to the hardware 103. FIG. 1B shows a diagram of interaction modified in accordance with one aspect of the present invention, in which calls to the original API functions by the application 101a may be replaced by the calls to the modified API functions. In one example aspect, the modified API functions may be provided by a library of handler functions 104, while the handler functions may call the original API functions provided by the OS 102. In one example aspect, a hander function may be a function that includes a functionality of another function.

Figure 2:
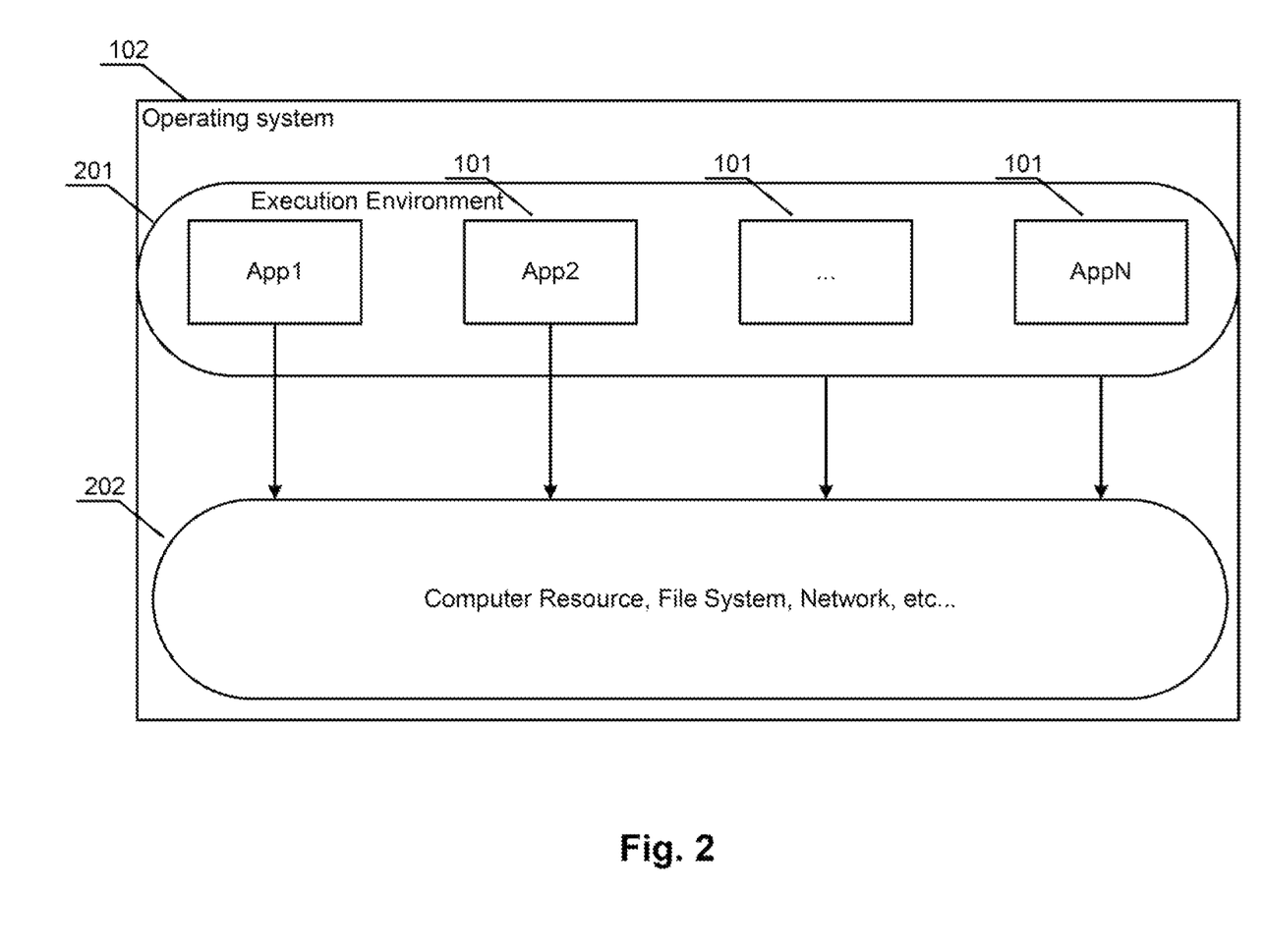
FIG. 2 is a block diagram illustrating the structure of a typical mobile operating system.

FIG. 2 shows a simplified diagram of a typical structure of a mobile OS, Generally, the operating system (OS) 102 provides an interface for interacting with the physical components of the mobile device. In one aspect, the OS 102 includes user applications 101 operating in an execution environment 201, which is a component of the OS 102 operable to support the execution of applications. The environment 201 may be a Java virtual machine through which applications 101 interact with the resources 202 of the operating system 102.

Figure 3:
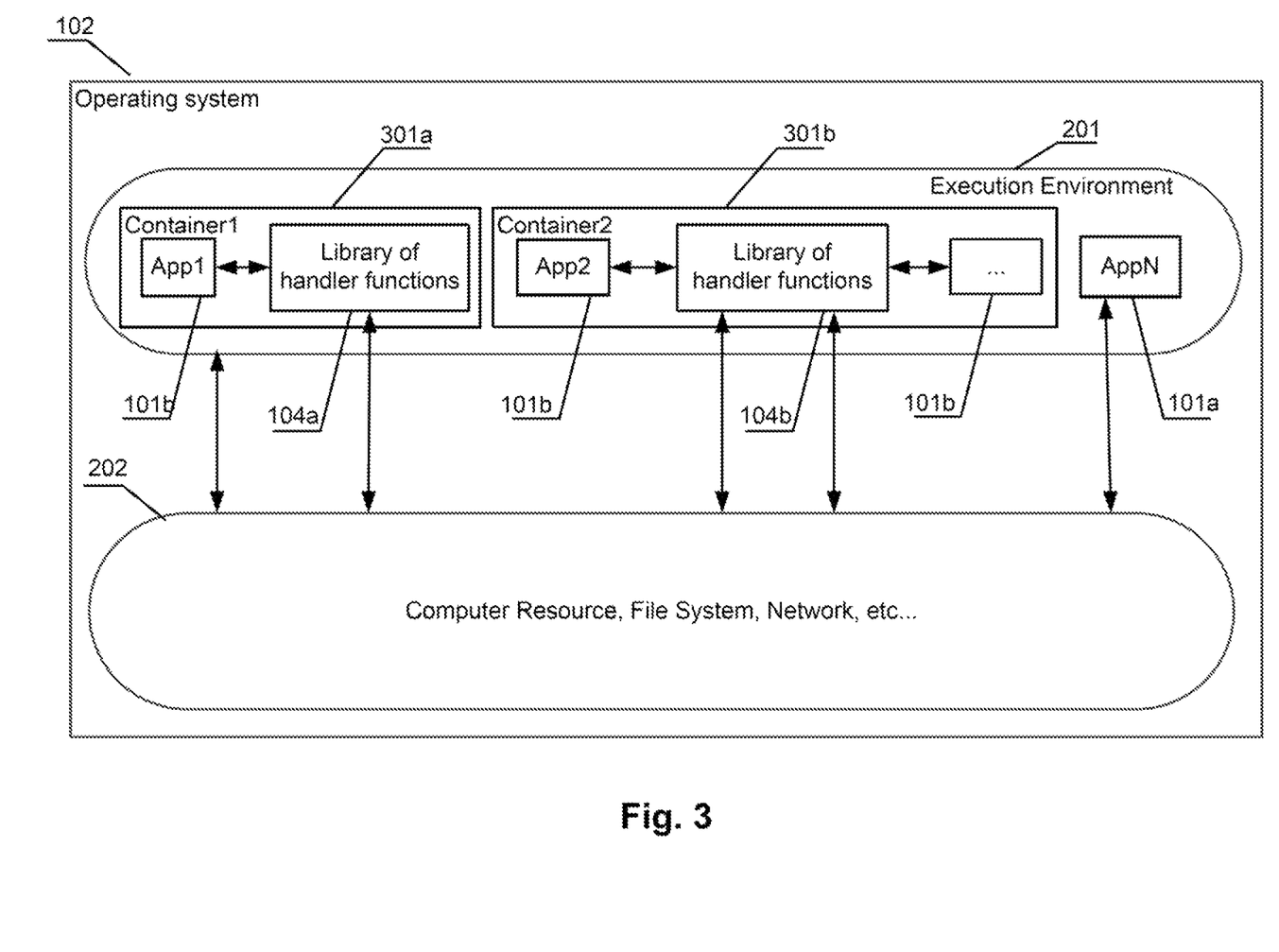
FIG. 3 is a block diagram illustrating a modified structure of the mobile operating system in accordance with aspects of the present invention.

FIG. 3 shows a modified version of the structure of the mobile OS of FIG. 2 in accordance with aspects of the present invention. To gain control over an application being executed on the OS 102, the OS 102 may be modified to include a system for protecting computer resources 202 from unauthorized access by the application 101. The system may be implemented as a secure environment 301, such as a container 301, for isolating applications 101b from the execution environment 201. The container 301 may include a library of handler functions 104 which are used to control access of applications 101 to critical system resources. In one aspect, the applications 101b may be placed in the container 301 and modified, e.g., stripped of the ability to directly call APIs of OS 102. The environment 201 now interacts with the container 301, which is a secure environment for the application 101b, in order to access protected system resources 202, the modified application 101b accesses the library of handler functions 104, which in turn checks associated security policies to determine whether application 101b is allowed to access the requested system resources 202. If security policy indicates that access to the requested system resource is allowed, the handler function from the library of handler functions 104 will call the requested API of the OS 102. In this manner, it is possible to monitor both incoming and outgoing network traffic, access to the file system, and the interaction of the application 101b with other applications 101a and 101b placed in the container or not.

In one example aspect, a group of two or more applications 101b may be placed in the same container 301b. Such applications may include applications with similar functionality, which may be covered by the same security policy associated with the container 301b.

Figure 4:
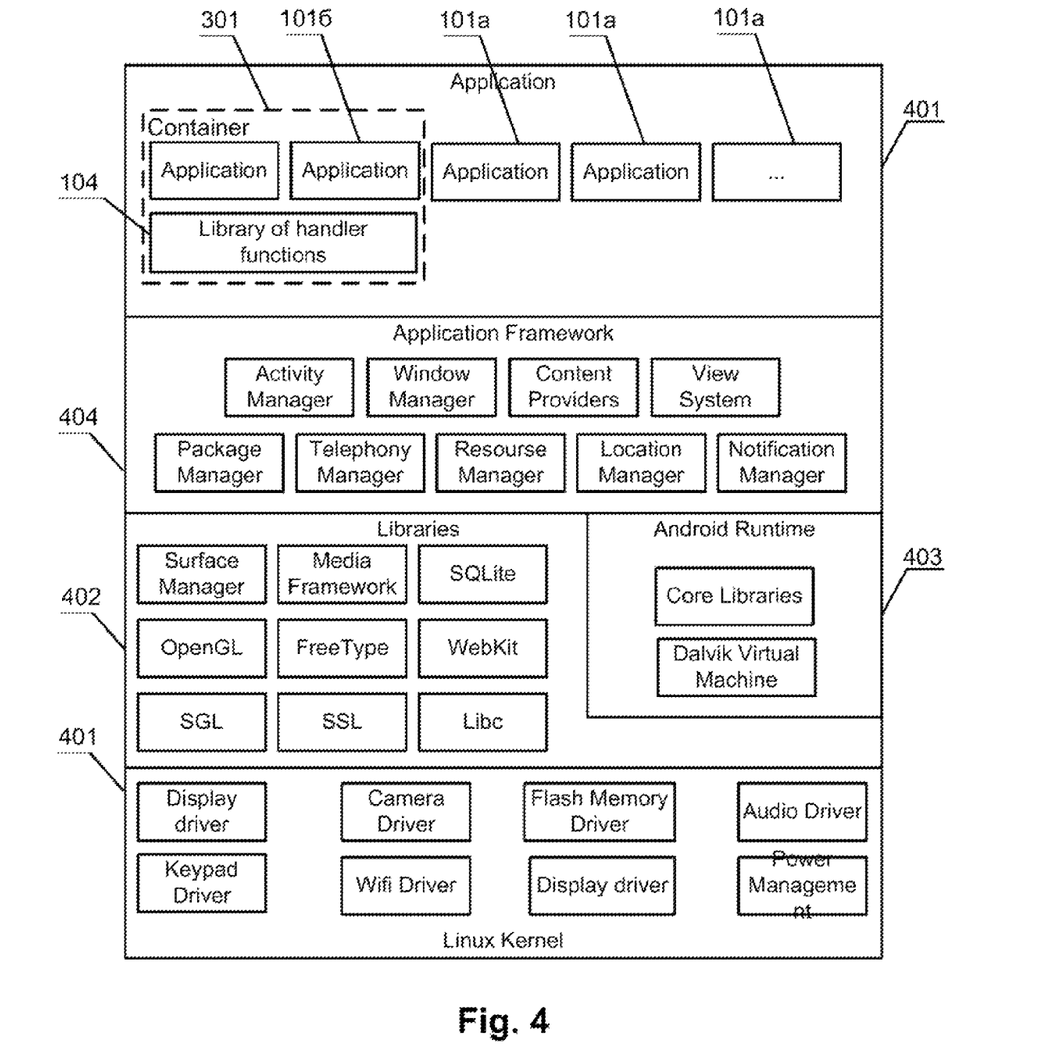
FIG. 4 is a block diagram illustrating an architecture of the mobile operating system Android OS in accordance with aspects of the present invention.

FIG. 4 illustrates an example implementation of the system of the present invention in a popular mobile operating platform Android OS. The Android architecture is based on a Linux kernel 401. The kernel 401 is responsible for such system services as security, memory and process management; it includes a network stack and a model of drivers. The next level in the hierarchical structure is libraries 402 written in C/C++ and used by different components of the OS. An important part of the architecture is Android Runtime (the application execution environment) 403. The execution environment consists of a Java virtual machine Dalvik and a set of basic libraries. Dalvik executes files in a special format, .dex, optimized for devices with a small amount of memory. The basic libraries are written in Java language and include a large set of classes which support a broad range of functional capabilities. The next level is the Application Framework 404. This level is a toolkit that is used by all applications. At the top of the hierarchy are the Applications (the application level) 401. Android does not distinguish between basic telephone applications and third-party software. Thus, the key components such as dialling number, desktop, Gmail client, and so forth can be replaced by alternative analogs or modified, which lets one use the present invention on this platform. But the platform has a peculiarity in that applications are executed in a sandbox (a rigorously monitored set of resources for executing a guest program) and do not have the right to modify components situated on the same level or lower levels. To monitor applications in the Android OS, the application is placed in a container 301, where the .dex file of the application 101a is modified by replacing the critical classes with the names of classes that are specified in the library 104. The following are examples of critical classes and methods that may be modified:

java.io.*
    java.lang.Runtime.loadLibrary( )
    java.lang.Runtime.exec( )
    android.app.ActivityManager.getRunningServices( )
    javax.crypto.Cipher
    java.lang.System.loadLibrary( )
    java.lang.ClassLoader.getResourceAsStream( )
    android.webkit.WebView
    android.telephony.SmsMessage
    android.content.BroadcastReceiver.abortBroadcast( )
    android.app.Activity.startActivity( )
    android.content.Context.getClassLoader( )
    android.content.Context.startActivity( )
    android.content.ContextgetSystemService( )
    java.net.*
    java.lang.Class.getClassLoader( )
    java.lang.Class.getClasses( )
    java.lang.Class.getResourceAsStream( )
    android.telephony.SmsManager.*

The modification provides control over the critical activity of an application. The modification may be done at the stage of loading the application, or the copy of an already installed application may be modified. If a critical action is attempted, the application 101b will not be able to perform it, since the original class has been replaced by the class described in the library 104. Therefore, the corresponding method will first be called from the library 104 and a check will be done for compliance of the action being performed with the security policy. If the critical action does not violate the security policy, the original OS method will be called.

Figure 5:
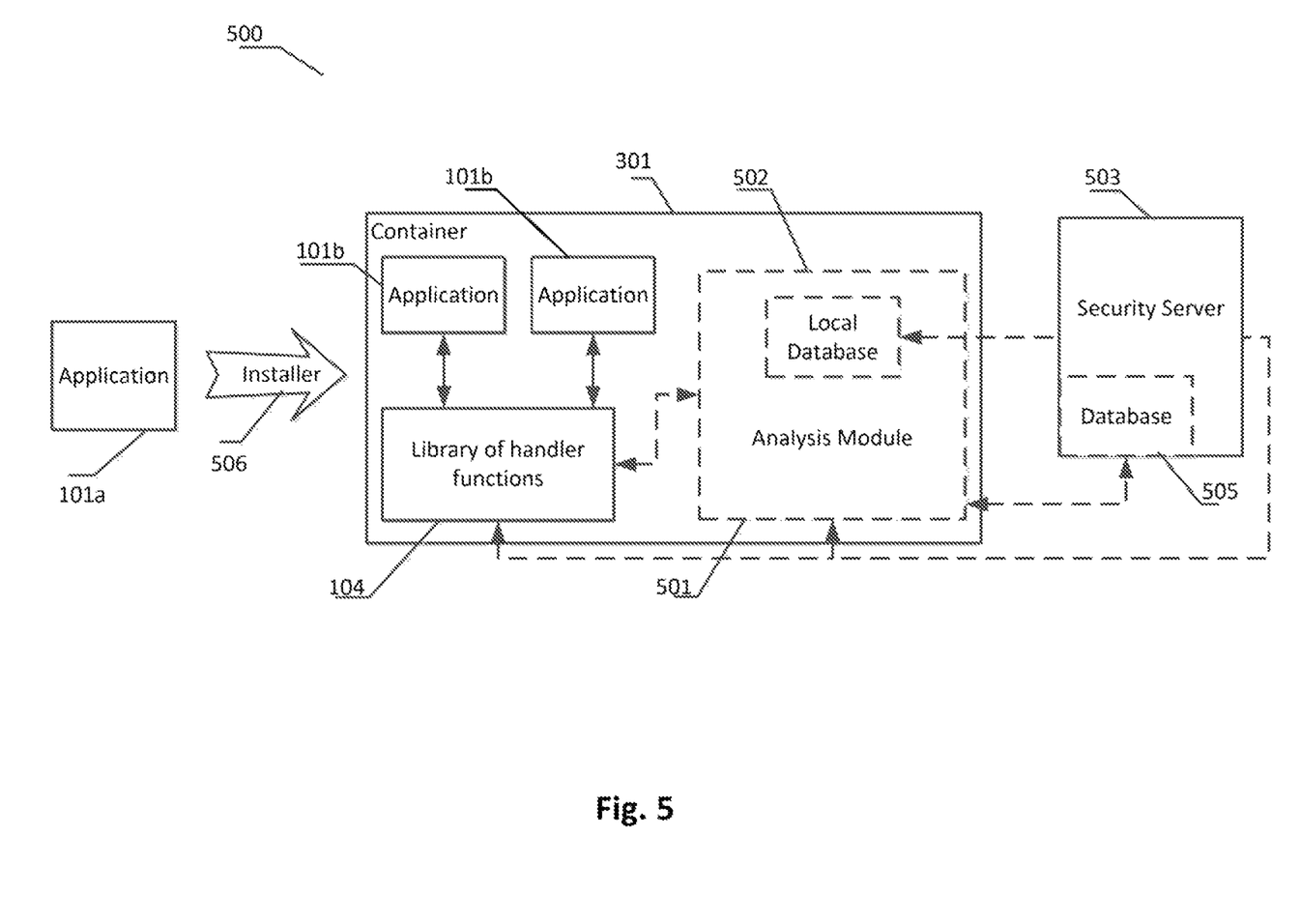
FIG. 5 is a block diagram illustrating an example configuration of the system for detecting malware in accordance with aspects of the present invention.

FIG. 5 shows an example configuration of the system for detection of malicious software in the code of applications in accordance with aspects of the present invention. The system 500 includes a container 301 of applications 101b. The applications 101a may be placed in the container by the user or automatically during the loading stage, by a previously provided toolkit. For example, such a toolkit may be provided by an antivirus application, which will place entrusted and suspicious applications in the container 301. In another example, such a toolkit may also be an installer 506, which places in the container 301 all applications 101a being downloaded from the network. The system 500 may modify the critical function calls of applications 101b that could be used malicious purposes (e.g., sending of SMS, access to the network, working with the file system, etc.). The critical functions may be replaced by handler functions, which are specified in the library of handler functions 104. The system may also includes an analysis module 501, designed to detect malicious software, and a local security rules database 502, containing information (e.g. templates) on the characteristic behaviour of malware and rules for blocking them. The database 502 may contain, for example, a template of certain sequence of calls of critical functions with prohibited parameters (e.g., sending of SMS to short numbers) downloading a file from an untrusted network resource, etc.).

In one example aspect, the system 500 monitors the execution of the applications 101b placed in the container 301 and keeps track of the activity of the applications 101b. An application 101b cannot directly call critical functions, the calls to the critical functions are performed by handler functions. The library 104 transmits to the analysis module 501 information about the functions being called (e.g., the names of functions and the parameters of the calls), and the analysis module 501 may compare the information obtained from the library 104 with malware templates from the local database 502. If on the basis of the analysis by the analysis module 501, behaviour characteristic of malicious software is detected, the system 500 may take appropriate actions in accordance with the security policies specified in the database 502. For example, the library of handler functions 104 may block calls to the critical functions (i.e., the library does not call the original API function in the OS 102), the application 101b will be halted or dosed, the user may receive a warning message, etc. in one aspect, the analysis module 501, library 104 and local database 502 may updated from the security server 503, which enables a timely response to new threats (e.g., expanding the list of critical functions, adding new malware templates and security rules to the local database 502).

In one example aspect, the analysis module 501 may not use the local database 502, but instead may access a remote database 505 on the security server 503. In another aspect, the analysis module 501 itself can reside remotely on the security server 503. In this case, the library 104 on the local device will gather information about the operation of the application being analyzed and forward this information to the remote security server 503, where the information received will be analyzed by the remote analysis module 501, in another aspect, the security module 501 and local database 502 can be integrated with the library 104.

The described system for the detection of malicious software may be used, for example, to intercept attempts by malicious applications to send text messages. In this case, the following methods (i.e., functions) may be critical to the operation of the application:

android.telephony.gsm.SmsManager.sendTextMessage( )
    android.telephony.gsm.SmsManager.sendMultipartTextMessage( )
    android.telephony.gsm.SmsManager.sendDataMessage( )
    android.telephony.SmsManager.sendTextMessage( )
    android.telephony.SmsManager.sendMultipartTextMessage( )
    android.telephony.SmsManager.sendDataMessage( )
    java.lang.reflect.Method.invoke( )

To control access of the application 101 to these methods, the application calls to the above-listed methods may be modified. After placing the application 101 in the container 103, the critical methods may be replaced in the application. For example, the method:

android.telephony.SmsManager.getDefault( ).sendTextMessage("<phone_number>", null, "<message_text>", null, null);

may be replaced with the call to the following method:

com.kaspersky.container.hooks.android_telephony_SmsManager.sendTextMessage (android.telephony.SmsManager.getDefault( ), "<phone_number>", null, "<message_text>", null; null);

The description of these methods is found in the library 104, which extracts the parameters of the method called up and transmits them for analysis; an example of the library code for a number of critical methods may look like this:

```
package com.kaspersky.container.hooks;
    public class android_telephony_SmsManager {
        public static void sendTextMessage(Object impl, java.lang.String arg1,
java.lang.String arg2, java.lang.String arg3, android.app.PendingIntent arg4,
android.app.PendingIntent arg5) {
            if
(!ISecurityManager.get("sms").allow(String.valueOf(arg1),String.valueOf(arg3))) { return; }
            ((android.telephony.SmsManager)impl).sendTextMessage(arg1, arg2,
arg3, arg4, arg5);
        }
        public static void sendMultipartTextMessage(Object impl, java.lang.String arg1,
java.lang.String arg2, java.util.ArrayList arg3, java.util.ArrayList arg4, java.util.ArrayList arg5) {
            if
(!SecurityManager.get("sms").allow(String.valueOf(arg1),String.valueOf(arg3))) { return; }
            ((android.telephony.SmsManager)impl).sendMultipartTextMessage(arg1,
arg2, arg3, arg4, arg5);
        }
        public static void sendDataMessage(Object impl, java.lang.String arg1,
java.lang.String arg2, short arg3, byte[ ] arg4, android.app.PendingIntent arg5,
android.app.PendingIntent arg6) {
            if
(!SecurityManager.get("sms").allow(String.valueOf(arg1),String.valueOf(arg4))) { return; }
            ((android.telephony.SmsManager)impl).sendDataMessage(arg1, arg2,
arg3, arg4, arg5, arg6);
        }
    }
```

This example code function contains description of three handler functions used to replace the original critical methods. Each of the functions checks to make sure the parameters used are permitted. If the requirements of the security policy are fulfilled, the original methods are called up. If the arguments do not withstand the check, the transmission of the text message will be halted in the given example. It is also possible not only to halt the message, but also to send an empty message, warn the user, close the application, and so on.

Figure 6:
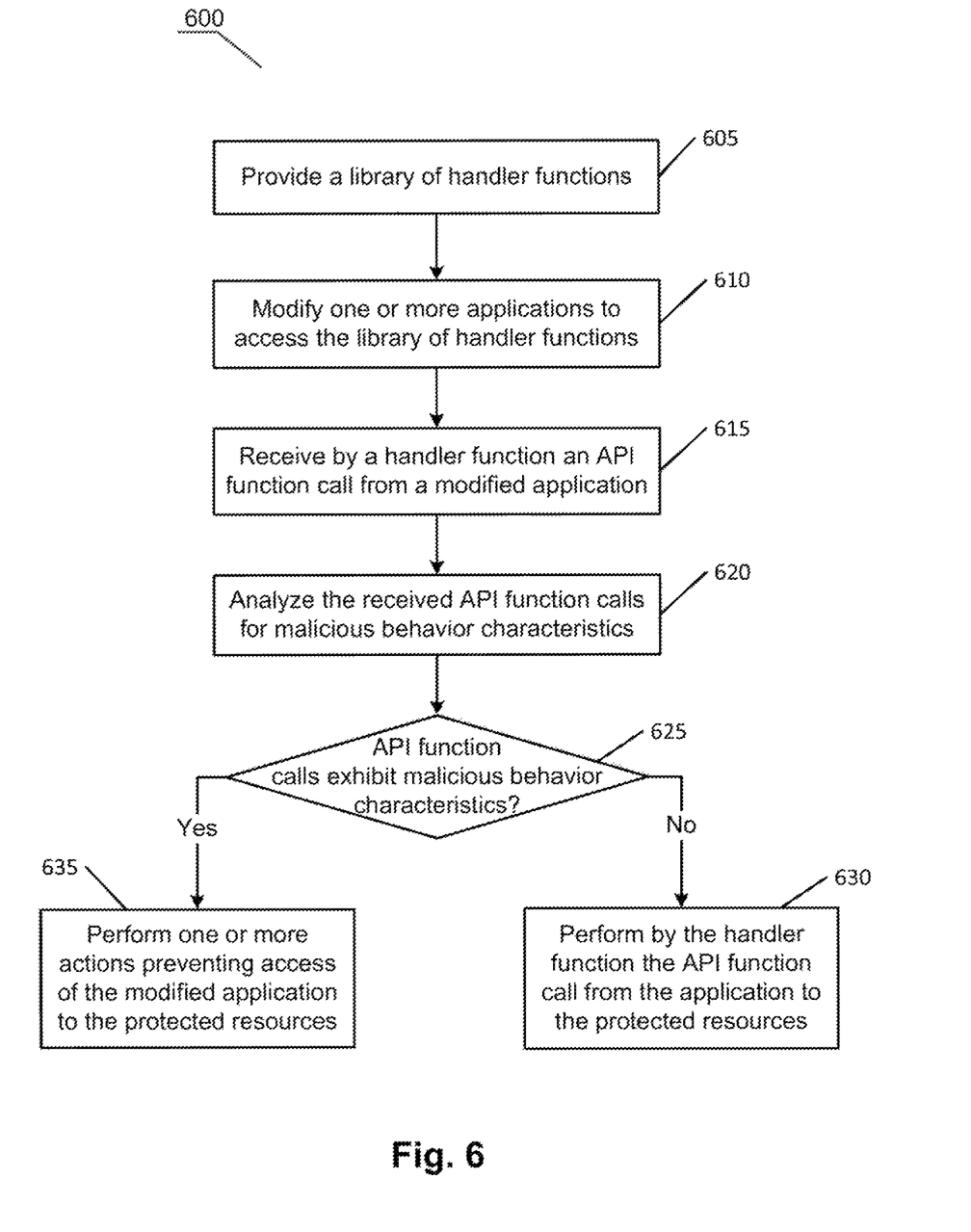
FIG. 6 is a flow diagram illustrating an example method for detecting malware using isolated environment in accordance with aspects of the present invention.

FIG. 6 shows an example method for detecting malware in accordance with aspects of the present invention. At step 605, the method 600 includes providing a library of handler functions. The handler functions control access of one or more applications to protected resources on a user device, such as a mobile device. In one example aspect, a network security serve, such as server 503 can provide the library of handler functions. In another example aspect, an antivirus application deployed on the user device can provide the library of handler functions. At step 610, the method 600 includes modifying one or more applications on the user device to access the library of handler functions instead of corresponding application program interface (API) functions of the user device. In one example aspect, the applications may be modified at the security server 503 or by the toolkit provided by the antivirus application on the user device. At step 615, the method 600 includes receiving by a handler function an API function call from a modified application. At step 620, the method 600 includes analyzing the received API function calls for malicious behaviour characteristics. In one example aspect, the analysis module 501 may perform malware analysis of the API function calls. At step 625, when the API function calls do not exhibit malicious behaviour characteristics, the method 600 proceeds to step 630 at which the handler functions perform the API function call from the application to the protected system resources. When the API function calls exhibit malicious behaviour characteristics, the method 600 proceeds to step 635 at which the handler functions perform one or more actions preventing access of the modified application to the protected resources, e.g., blocking the API function calls.

Figure 7:
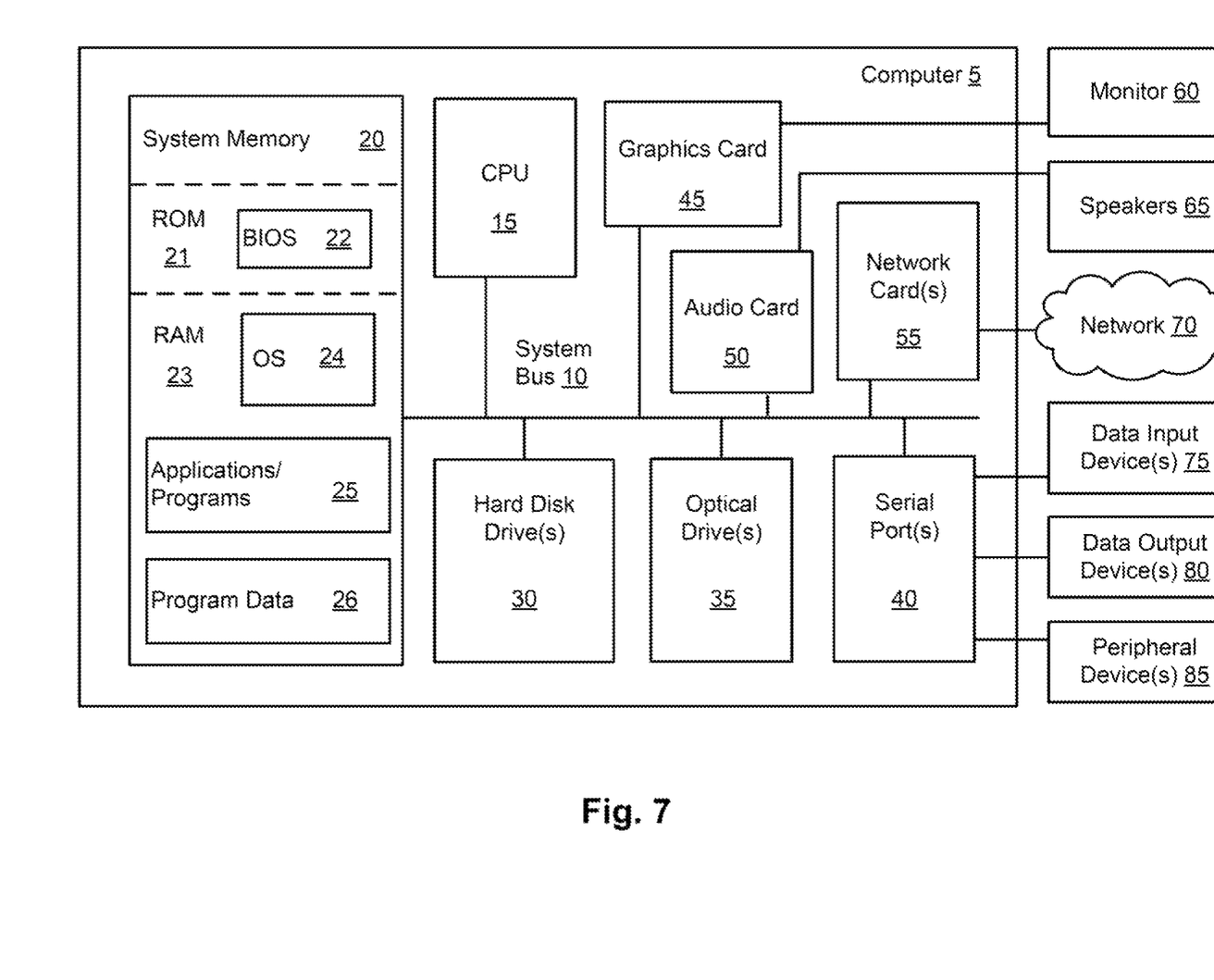
FIG. 7 is a block diagram illustrating an example general-purpose computer system in accordance with aspects of the present invention.

FIG. 7 depicts an example configuration of a general-purpose computer 5 that can be used to implement the disclosed system and methods for protecting computer resources from unauthorized access according to various aspects of the present invention. The computer system 5 may include, but not limited to, a personal computer, a notebook, tablet computer, a smart phone, a network server, a router, or other type of computing device. As shown, computer system 5 may include one or more hardware processors 15, system memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 7 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious applications, the method comprising:
providing a library of handler functions stored in an isolated environment on a memory accessible by a processor, where the handler functions control an access of one or more applications to protected resources on a computer device;
modifying, via the processor, a plurality of functions calls of the one or more applications when loading the one or more applications to be processed by the handler functions, to access the library of handler functions instead of corresponding application program interface (API) functions of the computer device by replacing one or more classes or methods of the one or more applications that perform function calls to the protected resources with one or more function calls to corresponding handler functions contained in the library and storing the modified one or more applications in the isolated environment;
receiving, by the handler functions, one of the plurality of function calls from a modified application;
analyzing via the processor the received function call for malicious behavior characteristics;
performing by the handler functions the received function call to the protected resources upon determining that the received function call contains no malicious behavior characteristics; and
preventing the modified application to access the protected resources upon determining that the received function call contains malicious behavior characteristics.

2. The method of claim 1, wherein preventing the modified application to access the protected resources comprises blocking the received function call from the modified application, terminating an execution of the modified application or sending a warning notification to a user.

3. The method of claim 1, wherein replacing one or more classes or methods of the one or more applications comprises replacing the one or more classes or methods contained in an application file having *.dex extension, wherein the application is transmitted to the isolated environment in which the file having the *.dex extension is modified.

4. The method of claim 1, wherein the isolated environment includes a container.

5. The method of claim 4, further comprising placing a plurality of applications into the container and associating a security policy with the plurality of applications in the container.

6. The method of claim 1, wherein the protected resources include one or more of network resources, file system, operating system, and other applications or programs.

7. A system for detecting malicious applications, the system comprising:
a memory configured to contain an isolated environment for storing a library of handler functions, where the handler functions are configured to control an access of one or more applications to protected resources on a computer device;

a hardware processor coupled to the memory and being configured to:

modify a plurality of functions calls of the one or more applications when loading the one or more applications to be processed by the handler functions, to access the library of handler functions instead of corresponding application program interface (API) functions of the computer device by replacing one or more classes or methods of the one or more applications that perform function calls to the protected resources with one or more function calls to corresponding handler functions contained in the library and store the one or more modified applications in the isolated environment;

receive, by the handler functions, one of the plurality of function calls from a modified application;

analyze the received function call for malicious behavior characteristics;

perform via the handler functions the received function call to the protected resources upon determining that the received function call contains no malicious behavior characteristics; and prevent the modified application to access the protected resources upon determining that the received function call contains malicious behavior characteristics.

8. The system of claim 7, wherein the processor is configured to prevent the modified application to access the protected resources at least by blocking the received function calls from the modified application, terminating an execution of the modified application or sending a warning notification to a user.

9. The system of claim 7, wherein to replace one or more classes or methods of the one or more applications, the processor is further configured to replace the one or more classes or methods contained in an application file having a *.dex extension, wherein the application is transmitted to the isolated environment in which the file having the *.dex extension is modified.

10. The system of claim 7, wherein the isolated environment includes a container.

11. The system of claim 7, wherein the protected resources include one or more of network resources, file system, operating system, and other applications or programs.

12. The system of claim 7, wherein the protected resources include encrypted data, and the handler functions stored in the memory are configured to receive the encrypted data, decrypt the encrypted data and transmit the decrypted data to the one or more applications.

13. A computer program product embodied on a non-transitory computer-readable storage medium, the computer program product comprising computer-executable instructions for detecting malicious applications, including instructions for:

providing a library of handler functions stored in an isolated environment, where the handler functions control an access of one or more applications to protected resources on a computer device;

modifying a plurality of functions calls of the one or more applications when loading the one or more applications to be processed by the handler functions, to access the library of handler functions instead of corresponding application program interface (API) functions of the computer device by replacing one or more classes or methods of the one or more applications that perform function calls to the protected resources with one or more function calls to corresponding handler functions contained in the library and storing the one or more modified applications in the isolated environment;

receiving, by the handler functions, one of the plurality of function calls from a modified application;

analyzing the received function call for malicious behavior characteristics;

performing by the handler functions the received function call to the protected resources upon determining that the received function call contains no malicious behavior characteristics; and preventing the modified application to access the protected resources upon determining that the received function call contains malicious behavior characteristics.

14. The computer program product of claim 13, wherein the instructions for preventing the modified application to access the protected resources comprise instructions for blocking the received function call from the modified application, terminating an execution of the modified application or sending a warning notification to a user.

15. The computer program product of claim 13, wherein instructions for replacing the one or more classes or methods of the one or more applications further comprise instructions for replacing the one or more classes or methods contained in at least one application file having *.dex extension, wherein the at least one application is transmitted to the isolated environment in which the file having the *.dex extension is modified.

16. The computer program product of claim 15, further comprising instructions for placing a plurality of applications into a container and associating a security policy with the plurality of applications in the container.

17. The computer program product of claim 13, wherein the isolated environment includes a container.

* * * * *